United States Patent Office 2,948,579
Patented Aug. 9, 1960

2,948,579

HIGH SPEED PLOTTING SYSTEM

Bernard J. Baecher, 1300 Hillside Place, Sea Cliff, N.Y.

Filed May 14, 1954, Ser. No. 430,003

15 Claims. (Cl. 346—8)

(Granted under Title 35, U.S. Code (1952), sec. 266)

The invention described herein may be manufactured and used by or for the Government of the United States of America for governmental purposes without the payment of any royalties thereon or therefor.

The present invention relates to an improved recording or plotting mechanism or system for plotting a record of variations in a plurality of electrical quantities over a period of time. The apparatus is primarily described in connection with a dead reckoning target plotter wherein the positions of moving targets are plotted upon a surface representing a geographical area. Further systems are shown wherein the temperature and pressure of steam, and the voltage and current in electrical circuits are plotted. Any quantities capable of representation as a function of two variables may be recorded and plotted by the improved mechanism.

An object of the present invention is to provide an improved recording and plotting mechanism.

Another object of the invention is to provide an improved method of plotting data.

A further object of the invention is to provide an improved recorder capable of plotting a plurality of variable quantities indicating the relationships therebetween.

A further object of the invention is to provide a novel printing mechanism for plotting one or more variable input quantities on a record sheet.

A still further object of the invention is to provide a recording and plotting mechanism for a plurality of input quantities with a provision for projecting a non-plotted variable upon the record to indicate the relationships of the recorded and non-recorded variables at any time.

Other objects and many of the attendant advantages of this invention will be readily appreciated as the same becomes better understood by reference to the following detailed description when considered in connection with the accompanying drawings wherein:

Figure 1 is a general schematic diagram of a typical set-up wherein improved recording and plotting system according to the present invention may be used to advantage;

Figure 2 is a front view in section taken along line 2—2 of Figure 3 of an actual recording and plotting system constructed in accordance with the principles of the invention, and showing a plurality of printing units thereof;

Figure 3 is a top view in section, taken along line 3—3 of Figure 2;

Figure 4 is an end view similarly in section taken along line 4—4 of Figure 3;

Figure 5 is a schematic diagram of a portion of the specific apparatus shown in Figures 2, 3 and 4;

Figure 6 is a schematic diagram of one of the servo motor systems for positioning a solenoid actuated plotter printing element used in the improved plotter and recorder system;

Figure 7 is a schematic diagram of one of the balanceable networks associated with a solenoid actuated printer element of a printer unit;

Figure 8 is a schematic diagram of the circuit which is used for actuating the solenoid of a solenoid actuated printing element;

Figure 9 is a view of a portion of Figure 4 drawn to a large scale to show the structural details of a printing unit;

Figure 10 is a detail elevational view of the solenoid operated printer elements;

Figure 11 is a detail sectional view of a data projector used to project data upon the plotting screen of the system;

Figure 12 is a detail top view of a first reticle means used in the projector of Figure 11;

Figure 13 is a detail top view of a second reticle means also used in the projector of Figure 11.

Figure 14 is a schematic diagram indicating the manner in which the recording and plotting system may be applied to the problem of plotting temperature and pressure in steam lines; and Figure 15 is a schematic diagram indicating the manner in which the system may be used to plot current and voltage values in electrical circuits.

The improved recording and plotting system according to the invention is designed to record and plot variations in a plurality of sets of data, each set of which may be represented as a function of two variables. A typical example of such data is a number of geographical locations which may be represented in terms of North-South and East-West components. Other examples of such data may be found in temperature-pressure plots of conditions existing at different points in a steam system, current and voltage relationships at various points in an electrical circuit, etc. The above examples are intended by way of illustration only it being understood that the particular data involved is immaterial. The system will be first described as one using data representative of a plurality of geographical locations.

Figure 1 illustrates a comprehensive set up, such as might be used on a combat ship for plotting and recording the location of various targets such as enemy vessels. As shown here the set-up utilizes a plurality of automatic tracking radar or sonar systems of a type well known in the art. One of these systems is used for each target whose position is to be recorded; and two such systems are represented by blocks 11 and 11n. The radar or sonar system 11 has a directional antenna or transducer 13 automatically maintained oriented at its particular target in a known manner. The output of the radar or sonar system is expressed in terms of two shaft rotations representative respectively of the relative bearing data of the target with respect to the ship and its range or distance data from the ship. This output modifies a reference voltage fed into terminals Y and Z, for producing servo data in servo transmitter unit 15 which is representative of this output. The servo data is then fed out via cables represented by lines 17 and 19. The servo transmitter unit 15 may, for example, be a pair of selsyn transmitter units energized from the source Y—Z and rotated by the two output shafts of the radar or sonar unit 11.

The relative bearing data is converted to true bearing data in a true bearing converter unit 21. This unit may consist of a differential selsyn having one set of windings energized by the relative bearing data and having its rotor element driven from a compass 23 through a linkage 25 indicated by the dotted line. Linkage 25 may be any conventional torque amplifying system known to the art. The modified data representative of the true bearing of the target is fed through a cable 27 to a servo 29 which converts the data to a rotation of a true bearing data shaft 31. The servo 29 may be a selsyn controlled motor system of a conventional known type.

Range data in cable 19 is fed to a range servo unit 33. This unit may be a selsyn controlled motor system similar to servo element 29. The range data is converted to rotation of a range output shaft 35. Range output shaft in turn operates a slider 37 on a potentiometer 39.. The potentiometer slider output voltage is therefore proportional to the range of the target as measured by the radar or sonar apparatus 11.

The voltage output of the potentiometer is passed through a booster amplifier 41 to the primary winding 43 of a resolver 45. The resolver 45 has two rotor windings 47 and 49 relatively displaced at 90° and driven with respect to the primary winding 43 by the true bearing shaft 31. The voltages induced in windings 47 and 49 are proportional to the East-West and North-South components respectively of the geographical location of the target. The voltages from the secondary windings are fed to a recorder and plotter system 51 in accordance with the invention. This system 51 will be more fully described hereinafter.

Duplicate radar or sonar systems, one for each of the targets under consideration are provided and these systems are schematically indicated by the set-up shown in Figure 1 wherein the elements of the system are the same as those described above. The additional systems are indicated by using the same reference characters with the addition of the suffix $n$. Reference character 11$n$, for example, represents duplicate radar or sonar apparatus corresponding to that given reference character 11 in the preceding description. As many duplicate systems may be used as desired, within the capacity of the recorder and plotter system 51.

The structure of the recorder and plotter system 51, indicated by a block in Figure 1, is shown in Figures 2, 3 and 4 while Figure 5 is a schematic representation of the same apparatus. This system, which will now be described, is usable in the set-up shown in Figure 1, or with any other set-up which can produce pairs of electrical voltages, each pair of which is representative of a pair of related functions of the variable to be plotted. All the variables are plotted upon a single record sheet or surface and the relationship between the different variables is shown by the resulting record.

The recorder and plotter system 51 is contained in a casing 53 as shown in Figure 2, and comprises of a plurality of elongated channel printing units 55. All of the units are carried by a pair of endless chains 57 carried by roller elements 60 bearing in a pair of guides 59 mounted at opposite vertical sides of the casing 53. The chains are driven by sprockets 61 through a gear reduction device 63 from a drive motor 65. A conventional means, not shown, may be provided to vary the speed of drive motor 65 if desired.

The printing, for plotting and recording purposes, is accomplished by solenoid actuated printing elements 66 one of which is carried by each of the channel printing units 55. Each solenoid actuated printing element 66 has a printing plunger which, upon actuation of the printing element 66, is driven upward, as viewed in Figure 2, to strike the underside of a waxed paper record sheet 67, forcing the sheet against a recording plate 69 which is formed of transparent Lucite or other similar light conducting plastic material. Each printing plunger carries on its upper face an identifying type character which is inked during travel of the printing units by an inking pad 71. It will be apparent that each solenoid actuated printing element 66 is carried longitudinally of the casing 53 as shown in Figure 2 by its associated channel printing unit 55. This movement will hereafter be referred to as the E-W data movement.

Each solenoid actuated printing element 66 is also arranged to travel transversely of the casing 53 as is apparent in Figure 4. The printing elements 66 are driven in this direction by a servo motor acting through a cord and pulley arrangement carried on the channel printing units 55, which will be more fully described hereinafter. This component of motion of the printing elements will hereafter be referred to as the N-S data movement.

The speed of the movement of the channel printing units 55 is determined by the rate of variation of the data being recorded. A speed such that a print of each target position is obtained every four seconds has been found satisfactory for this application of the embodiment of the invention presently being described.

Various electrical connections are made to each channel printing unit 55 by means of brushes 73 carried by the printing unit and bearing upon conductor strips 75. The strips 75 arranged in banks along the path of movement of the printing units 55. Sets of brushes 73 are provided at both ends of the channel printing units 55. The brushes and conductor strips are shown schematically in Figures 2, 3 and 4. The actual structure may be seen in Figure 9. It will be apparent in Figure 3 of the drawing that the conductor strips 75 are placed in the casing 53 so that they are engaged by the brushes 73 in certain parts of movement of the units 55. Each conductor strip 75 as shown in Figure 9 is actually made up of a series of conductor elements insulated from one another and their purpose and relationship will be described later in connection with the schematic illustration of Figure 5.

Referring now to Figures 2 and 3, an arrangement to project "own ship's position" and other data upon the paper record sheet 67 is shown therein. Other functions of the projector apparatus will be subsequently described but for the present the arrangement will be described only in terms of location of "own ship" with respect to the positions of the various targets as plotted on the recording plate 69 or the paper record sheet 67. A light projector unit is indicated generally at 77 and its purpose is to project an image, to convey information, onto the paper record sheet 67 where it may be viewed through the transparent Lucite recording plate 69. It will be noted that the drive chains 57 carrying the various channel printing units 55 have a relatively large portion thereof which carries no channel printing units. This portion of the chains may be brought into position under the record plate 69 and further movement of the chain drive mechanism halted when the projector unit 77 is to be used.

The projector unit 77 is mounted on a carriage which is positioned wtih respect to the casing 53 by a control mechanism comprising an E-W lead screw 81 and a N-S lead screw 83. The E-W lead screw is driven through a transmission means 85 by an E-W servo motor 87. The transmission means 85 may be a geared transmission mechanism of any conventional type. The N-S lead screw is similarly driven by a bevel gear 89 meshing with a second bevel gear 90 riding upon and driven by a splined shaft 91. The shaft 91 is in turn driven through a transmission means 95 similar to transmission means 85, by a N-S servo motor 97. The servo motors 87 and 97 are controlled by a dead-reckoning position control device capable of reducing the movement of the ship to E-W and N-S components of movement for the lead screw drives to the projector unit. The dead-reckoning control device is not a part of my invention; and it is believed that it is sufficient to state that it may be any of a group of known devices wherein the distance of travel of the ship may be measured, for example, by the number of rotations of a propeller shaft, and this quantity may be resolved into E-W and N-S components through a resolver device driven from the ship's compass. Both mechanical and electrical systems of this type are known to the art and need not be described more specifically.

Various electrical inputs to the projector 77 and the control mechanism therefor are brought in through conductor strips 101 and 103, which are similar in construction to conductor strips 75 previously described. Brushes ride upon the conductor strips 101 and 103 but are not visible in these figures of the drawing.

The projector 77 carries a lens barrel 99 on its upper portion and data images are projected upwardly therefrom to the lower surface of the waxed paper record sheet 67. The position of the projector 77 and hence of the data images projected thereby with respect to the record sheet will be determined by the information fed from the dead-reckoning device to the E-W and N-S servo motors 87 and 97 driving their respective lead screws 81 and 83. Further details of the projector will be described hereinafter.

A general schematic representation of the recorder and plotter system 51 thus far described is shown in Figure 5 of the drawings. It is believed that a description of the relationships of the various portions of the apparatus and the manner in which they operate will be advantageous before describing in detail the specific parts of the system generally outlined in the description of Figures 2, 3 and 4 above.

The overall recorder and plotter system 51 of Figure 1 is shown in Figure 5 enclosed in a dotted line block to which reference character 51 has also been applied. All parts shown in Figure 5, which have previously been described in connection with Figures 2, 3 and 4 above, have been designated by the same reference characters.

The input leads to the various channel printing units 55 are shown at the left hand edge of the unit 51, each set of leads being identified by a bracket bearing the appropriate channel number. Four sets of such input leads are shown in Figure 5. Input leads designated with the channel numbers 1, 2 and 3 are connected to appropriate ones of the conductor strips 75 and thence can connect through brushes 73 to the corresponding channel printing unit 55. Input 1, for example, can connect through the associated conductor strips 75 and brushes 73 to channel No. 1 printer 55. The fourth input, designated with the bracket and the symbol $n$, is intended only to indicate that the schematic representation of Figure 5 is limited with respect to the number of channels shown, but more may be used in the system. Connections to the other channels are similar to those shown.

Leads from a voltage-regulated source of alternating current are shown at 105, 107. These leads are connected through a transformer 109 to an auto-transformer 111 and to terminals Y and Z. A variable slider 113 on the autotransformer winding 11 is connected to a third terminal X. A voltmeter 114 having a scale calibrated in terms of the units of the variables to be plotted is connected across the terminals X and Y. The adjustable slider 113 is used to change the scale of the plot obtained on the record sheet as will be explained.

Channel No. 1 printing unit shows schematically the apparatus included in the channel printing units 55. All of the channel printing units used in the recorder and plotter are identical and contain the same apparatus. As may also be seen in Figures 5, 6, 7 and 9, each channel printing unit 55 contains a N-S servo system which adjusts the position of its solenoid actuated printing element 66 in the N-S direction or transversely with respect to the outer casing 53 or lengthwise of the channel unit as shown in Figure 5. This servo system is of the balanceable network type and includes as the major parts thereof an amplifier 115, a N-S servo motor 117 and a balancing potentiometer 119 having an adjustable slider 121. The servo motor 117 is connected through a mechanical linkage 123 to a drive pulley 125 which in turn actuates an endless drive wire 127 which is passed around an idler pulley 129. The slider 121 and the solenoid actuated printer 66 are mounted on a carriage element 131 attached to the drive wire 127 so as to be driven thereby. Carriage 131 is equipped with wheels 133 bearing upon rails 135. Electrical connections to the solenoid actuated printer 66 and the slider 121 are made through relatively-insulated conductor strips 137 having brushes bearing thereon mounted on carriage 131. The conductor strips connect to a circuit for the solenoid actuated printer, which includes a condenser discharge trip circuit 139 and a rectifier and condenser charging circuit 141. These circuits, which will be more fully described hereinafter, receive their energizing and control voltages through brushes bearing upon the conductor strips 75 and a further brush bearing upon an E-W component plotter balancing potentiometer 143.

The lower right hand section of Figure 5 represents the own ships movement portion of the apparatus. As has been previously described, own ship's position is indicated on the plotter surface by means of a projector 77. The position of the projector with respect to the plotter surface is controlled by information fed to the overall plotter mechanism from a dead-reckoning control device not shown in the drawings. As previously indicated the components of movement of the ship bearing the overall plotter system are fed in as E-W and N-S components which may be obtained from a resolver device actuated by the ship's propeller shaft and compass. These components are applied to the projector 77 through the agencies of the servo motors transmission mechanisms and lead screw mechanism represented schematically in Figure 5. The E-W component of ships motion is fed from the E-W servo motor 87 through a transmission means 85 to an E-W lead screw 81. Rotation of the screw 81 causes a carriage 145 bearing the projector 77 to move in the E-W direction. N-S information similarly causes N-S motion of the projector 77 transversely on the carriage 145, acting through the servo motor 97, transmission means 95, splined shaft 91, bevel gears 89 and 90 and the N-S screw 83. The projector 77 at all times bears a position with respect to the plotting surface representative of own ship's position in the target area.

Two potentiometers having sliders operated in accordance with the components of motion of the projector are provided. A ships E-W component potentiometer 149 has its resistor fixed in the casing 53 and has a slider element 151 attached to carriage 145 for providing an output voltage representative of the instantaneous E-W component of own ship's location. A ship's N-S component potentiometer 153 has a resistor carried by the carriage 145 and has a slider 155 attached to and operated by the projector 77 to produce an output voltage representative of the instantaneous N-S component of own ship's location.

It will be remembered from the discussion of Figure 1 that the information as to the various target locations which is represented by the E-W and N-S input voltages is derived from apparatus carried on own ship. If the target positions plotted from such data are to be correct in the geographical area represented by the plotting surface the data must be corrected for the movement of own ship which carries the detecting or data producing apparatus. The ships E-S and N-S component potentiometers 149 and 153 accomplish this purpose as will be shown in the simplified schematic diagrams of Figures 6 and 7 now to be described.

Figure 6 shows the servo control loop which controls the N-S servo motor 117 of the channel printing unit 55. All of the apparatus of Figure 6 is shown in Figure 5, but has been isolated here in order to make the operation of the system more readily apparent. A N-S data signal from the target served by channel 1 is applied to the input terminals as indicated. This signal voltage is combined with a voltage developed across a portion of own ship's motion potentiometer 153 and a further voltage developed across a portion of the plotter N-S potentiometer 119. The resultant of the three voltages is applied to the input circuit of amplifier 115. The output of amplifier 115 is fed to the servo motor 117 to cause it to rotate in such a direction as to balance out the input voltage by movement of potentiometer slider 121 through mechanical linkage 123. Motor 117, in balancing the voltages, also positions the solenoid actuated printer element 66 transversely of the plotting and recording element structure seen in Figure 2 and schematically shown in Figure 5. At every instant then, the solenoid actuated printer element 66 will be maintained in a position with respect to the transverse dimension of the record sheet which is determined by the value of the N-S data voltage at that instant minus the voltage developed on potentiometer 153 and representative of the N-S component of own ship's position.

It will be remembered that the various channel printing units are carried longitudinally of the record sheet 67 by the chains 57. As each channel printer unit is carried past the record surface a slider on the printer unit engages the plotter E-W balancing component potentiometer shown in Figure 7. Referring to Figure 7 it will be apparent that a loop circuit is set up for the input to the condenser discharge trip circuit 139. This loop circuit includes three sources of voltage, the E-W signal voltage of channel 1, the voltage developed across a portion of own ship's movement potentiometer 149 and the voltage developed across a portion of the plotter's E-W balancing potentiometer 143. At any given instant the algebraic sum of the values of the E-W signal voltage and the ship's movement voltage will be substantially fixed while the E-W plotter voltage will vary with the movement of the channel printer unit along the E-W plotter potentiometer 143. At some point in the travel of the printer unit the output voltage of the loop will pass through a balance or null point with a consequent reversal in phase of the total loop voltage. This reversal in phase actuates condenser discharge trip circuit and causes a momentary energization of the solenoid actuated printer 66 to force its plunger upward thus recording the position of the target associated with channel 1. The actual circuit of the condenser discharge trip circuit is shown in Figure 8 and will now be described.

The condenser discharge trip circuit has its input voltage coupled through a transformer 157 through a limiting resistor 159 to the control grid of a first vacuum tube 161. The plate of tube 161 is resistance coupled in conventional manner to the grid of a second tube 163 and the output of the tube 163 is in turn coupled to the grid of a third amplifier tube 165. The output of the third amplifier tube is in turn coupled to the grid circuit of a phase responsive demodulator tube 167. All the above amplifier tubes are energized from a common source of plate supply indicated at terminal 169 and the plate circuit of the demodulator tube 167 is also fed from this supply through a voltage-adjusting potentiometer 171 energized across said source and having an adjustable slider 173 to adjust the D.C. level of the plate voltage applied to tube 167. The plate circuit of tube 167 also includes an alternating current source shown as the transformer 175 having its primary energized from the terminals Y and Z of Figure 5. The plate circuit is completed through a load resistor 177 shunted by a condenser 179. The junction of the transformer secondary and the load resistor is directly coupled through a limiting resistor 181 to the grid of a thyratron tube 183. The thyratron tube 183 has an adjustable positive bias voltage applied to its cathode from the top of a potentiometer 185 connected across a positive source of potential. The plate circuit of the thyratron includes the coil 187 of the solenoid actuated printer element 66 and a condenser 189 having terminals 191 and 193 adapted to supply charging current to the condenser. The conductor strips 137 and brushes of the solenoid actuated printer 66 are indicated schematically.

During the travel of the printer units 55 and before they come into position beneath the record sheet 67, the circuit to terminals 191 and 193 is momentarily closed to charge the condenser. Terminals 191 and 193 are energized from the rectifier and condenser charging circuit 141 of Figure 5 and the momentary closure of the circuit may be accomplished by a cam-actuated switch (not shown) carried by the printer unit 55. The condenser once charged can only be discharged through the solenoid coil 187 and the thyratron 183.

As the slider bearing on plotter E-W balancing potentiometer 143 begins its travel by the record sheet the loop network is unbalanced. The unbalance voltage is coupled through the amplifier stages to the grid of phase responsive demodulator tube 167. The direction of unbalance of the network at this time is such that the grid voltage applied to the tube is in phase with the A.C. component of plate voltage applied by transformer 175. Tube 167, therefore, conducts a relatively large current therethrough and the voltage applied to the grid of thyratron 183 is at a level less than the positive bias on the cathode and the thyratron 183 cannot conduct. As the printer unit travels along the E-W potentiometer 143, the loop circuit becomes balanced at some location determined by the relative magnitude of the E-W signal voltage and the ship's position or movement voltage. When this occurs the voltage applied to the grid of tube 167 undergoes a reversal in phase and the conductivity of demodulator tube 167 is immediately decreased. The decreased conductivity in turn raises the potential of the grid of the thyratron tube 183 until it becomes sufficiently positive with respect to its cathode to fire the tube. The charge on condenser 189 discharging through solenoid coil 187 and thyratron 183 actuates the printer element 66. By proper adjustment of potentiometers 171 and 185 of the thyratron control circuit of Figure 8, the printed indication occurs at a point such that the recorded mark is placed in a proper E-W line of the record sheet 67 to indicate the location of the target.

Attention is directed to Figure 9 wherein a portion of Figure 4 has been drawn to a larger scale in order to show the details of the printing means. One end of one of the printing units 55 is shown carried in the guide 59 by the roller element 60 attached to the end of the unit. A portion of one of the sprockets 61 is visible in this figure. The solenoid actuated printing element 66 is mounted on its carriage 131 as shown. Carriage 131 as previously explained has wheels 133 engaging rails 135 of the printing unit 55. The drive wire 127 and a drive pulley 125 for operating the carriage 131 may also be seen in this view.

The printing or recording system 51 used herein is effective to make at least two records simultaneously and the apparatus capable of achieving this result will now be described. The closure for the upper portion of the plotter and recorder casing 53 is formed by the plate or panel 69 of Lucite or other transparent plastic material. The panel 69 is mounted in a removable rectangular frame 195 that follows the border portions of the casing 53. The frame 195 in turn engages a support member 199 forming a part of the casing 53. The support member 199 is formed along one side with hollow trough-like center sections. A hinged cover 201 is provided for access to the trough-like section. The center section recess contains a plurality of incandescent light bulbs 203 one of which is visible in Figure 9. The frame 195 and adjacent portion of the support member have a plurality of openings 205 and 197 respectively therein registering with one another to form a light passage from the lamps 203 to the edge of the Lucite panel 67. It will be apparent that the assembly as described constitutes an edgelighted panel.

The paper record sheet 67 as shown in position beneath the Lucite panel 69. This record sheet is a laminated structure having a waxed paper upper surface and a paper backing sheet on the lower side. The record sheet is held in the position shown in Figure 9 by a static charge established on the Lucite panel 69. The panel is rubbed with a piece of soft rubber or similar material to induce a static charge thereon. The record sheet is then placed in position below the panel and will adhere thereto due to the action of the charge placed on the panel.

When a printer solenoid 187 is energized an identifying type character placed on the end of the movable core of the solenoid is driven upwardly against the paper backing side of the record sheet. The waxed upper surface of the record sheet is thus driven upwardly and is forced into contact with the lower surface of the Lucite panel. The wax directly above the type character is pressed firmly against the panel and adheres to the surface of the plastic material. This produces a discontinuity in the otherwise smooth surface of the panel. The discontinuity scatters the light rays in the edge-lighted panel and appears as a glowing spot to the operator of the plotter system. At the same time an ink print is made on the lower surface of the record sheet by the type character forced into contact therewith. A print of the position of each target is obtained at regular periodic intervals and the successive prints from each channel printing unit clearly mark the course of the respective targets. The speed of the target can be determined by the distance between successive prints. The targets are identified or distinguished by using a different type character on each printing solenoid core.

The edge-lighted panel printer described above is not a part of the present invention but is disclosed and claimed in the copending application of Thomas Cymmer, Serial No. 429,998, filed May 14, 1954.

Figure 10 is a detail drawing of the solenoid actuated printer element or mechanism 66. The lower cylindrical body 207 contains the solenoid coil 187. An upper bearing member 209 guides a rod 211 slidably engaged therein which is actuated by the solenoid core not shown. Upon energization of the solenoid coil 187, the rod 211 is forced upwardly against the action of a restoring spring, not shown. Electrical connections to solenoid coil 187 are made at terminals 212 the rear portions of which are visible in this view. The rod 211 carries a type block 213 attached to the upper end of the rod by brazing or the like. The face of type block 213 has a raised portion in the forms of an identifying type character 215. Each solenoid actuated printing element bears a different type character so that the plots made by the different channel elements may be readily identified.

For the purposes of analysis it may be desirable to project own ship's positions onto the plotting surface. This is the function of the projector 77 shown in Figures 2 through 4 inclusive. The movement of the projector assembly by the servo motors 87 and 97 has already been described. The details of the structure of the projector mechanism are shown in Figure 11 which is a large scale view partly in section.

The projector 77 consists of lamp housing 221 containing a projector lamp 223 and a reflector 224. The housing is carried upon guide rails by the rollers 225. Electrical connections to the projector housing are made through brushes 104 bearing on the conductor strips 103. The ships N-S movement component potentiometer 153 and its slider 155 are visable at the lower right side of this view. Light rays from the projector lamp 223 pass through a condenser lens 227 and thence through a first reticle 229, a second reticle 231 and a projection lens carried in the lens barrel 99. Reticle 229 is carried by a rotatably supported ring mount 233 which has an annular ring 235 on its body which engages a plurality of idler member 239. The ring mount 233 is driven through a geared flange 237 which engages a drive gear 241 mounted on the shaft of a servo motor 243. The servo motor 243 may be controlled from the ship's compass 23. The servo motor 243 may be a receiver selsyn electrically connected to a transmitter selsyn (not shown) driven from the linkage 25 in Figure 1; and it constitutes the final or output element of a torque amplifier system (not shown) which causes reticle 233 to retain the same position as the ship's heading at any given instant.

The reticle 229 which is rotatable with respect to the plotting surface is shown in detail in Figure 12 and consists of a translucent element with a representation 245 of a ship's hull marked thereon in opaque material. The hull outline may be engraved in the translucent material and the groove filled with paint, for example. Relative bearing lines 247 are also marked on the reticle surface in a similar manner.

Reticle 231 is similar in nature to reticle 229 but is fixed in position. As shown in Figure 13, reticle 231 has a series of concentric circles 249 engraved thereon. These circles are representative of the range or distance from own ship's position. True bearing lines may also be applied to the surface of this reticle 231.

A composite image made up of the indicia on the superimposed reticles is projected on the paper record sheet 67 when the projector system 77 is in use. As previously pointed out the printing channel units 55 are not beneath the record sheet 67 when the projector is used.

Record sheet 67 is translucent and the image projected upwardly on the bottom surface thereof may be viewed from the top side of the sheet through the Lucite panel 69. The light projected from below, however, causes the wax impression recordings on the lower surface of the Lucite panel to become substantially invisible or at least very difficult to discern. It will be remembered, however, that as each impression was made the type characters on the solenoid plungers, having been previously inked by passage under the inking pad 71, printed the character on the lower surface of the record sheet 67 in opaque ink. The projector light used below the record sheet now causes the opaque printed figures to stand out in silhouette. The record impressions in use thus vary with the mode of operation of the machine. The edge-lighted wax impression recordings are used when the target position only, in the geographical area, is of interest. When interpreting the target position with respect to own ship's position the ink printed recordings are used.

It will, of course, be readily apparent that the edge-lighting feature of the panel may be omitted. The panel 69 may then be formed of any transparent or translucent material such as clear or frosted glass, for example. The material should be such as to take and hold a static electric charge for the purpose of holding the record sheet in position. The record sheet 67 need not be made of wax impregnated material but may be any translucent material such as paper. Examples of paper suitable for such use as for record sheets are tissue paper and tracing paper such as commonly used in drafting work. The inked type characters print on the lower side of record sheet 67 and no wax impressions are formed on the panel itself. Incandescent bulbs (not shown) are placed below the record surface to illuminate the panel throwing the recorded indications into silhouette on its face.

The slider 113 on the auto-transformer winding 111 of Figure 5 is used to set the value of voltage applied to the servo potentiometers of the printing units 55 and the ships motion projector 77. A change in value of this voltage shifts the amount of travel of the various elements using this source as a reference which is required in order to effect balance. Hence, the slider 113 adjusts the range scale of the device. A voltmeter 114 connected across leads has a scale which may be calibrated in terms of the scale represented on the face of the plotter panel 69. The voltage may thus be set to the desired value.

Figure 14 is a fragmentary view which diagrammatically illustrates a further use to which the novel recorder and plotter system may be put. In systems where steam is used it may be desirable to record and plot the temperature and pressure of the steam at a number of locations in the overall system. Figure 14 illustrates apparatus at one such measuring point within such a steam system. A steam line 251 is shown which is schematically representative of the portion of the system where measurement of pressure and temperature is to be made. A pressure responsive element such as a Sylphon bellows 253 is connected to steam line 251 by means of a tube 255. The pressure responsive bellows is mechanically connected by a linkage 257 to a slider 259 of a potentiometer element 261.

A temperature responsive Sylphon bellows 263 is similarly connected by a tube 265 to a thermal element placed in the steam line 251. The bellows 253 is connected through a mechanical linkage 267 to a slider element 269 on a second potentiometer 271. Both potentiometer 261 and potentiometer 271 are connected across the secondary of a transformer whose primary is connected as indicated to the terminals X and Y of the apparatus as shown in Figure 5. The voltage outputs of potentiometer elements 261 and 271 may be applied as indicated to the N-S and E-W input terminals of an input channel of the plotter 51. Other similar apparatus may be connected to the other input channels of plotter 51, as many channels being utilized as there are locations for which measurement is desired.

Figure 15 illustrates the apparatus by means of which the plotter may be applied to the recording of the values of voltage and current for different loads in an electrical system. The system as shown consists of an alternating power source 273 to which are connected a plurality of electrical loads 275 and 277. The voltage across the two loads shown is connected to the N-S terminals of a pair of input channels of the plotter 51. A pair of current transformers 279 and 281 have their primaries connected in series respectively with the loads 275 and 277. The secondaries of the current transformers are connected to the E-W terminals of the respective input channels of the plotter 51. The plots obtained will represent the volt-ampere characteristics of the two loads.

In the arrangements shown in Figures 14 and 15 the portion of the plotter apparatus of Figure 5 which makes a correction for own ship's position may be dispensed with if desired. Potentiometers 149 and 153 may be removed from the loop circuits (best shown in Figures 6 and 7) so that the resulting plots obtained will be absolute quantities. If, however, plots compensated for any given variables are desired these may be obtained by using the apparatus exactly as shown in Figure 5 with the quantities for which compensation is to be made being represented as inputs to the servo motors 87 and 97.

It is believed readily apparent from the modifications as described above that the improved plotter and recorder may be applied generally to any system wherein the quantities to be recorded may be represented as a function of two variables. Any apparatus known to the art may be used to reduce the values of the actual variables involved to electrical voltages representative of the instantaneous value of the variable.

Obviously many modifications and variations of the present invention are possible in the light of the above teachings. It is therefore to be understood that within the scope of the appended claims the invention may be practiced otherwise than as specifically described.

What is claimed is:

1. A point-by-point plotter comprising a support, a transparent plate carried by said support, a plurality of carriers, means mounting said carriers for movement on said support for movement in tandem succession, and in successive passes and always in the same direction along one face of, and in proximity to, said plate, an individual printing unit mounted on each carrier for movement therewith and also for separate movement thereon in a direction crosswise of its direction of travel with its said carrier, means for causing separate movement of each of said units on its carrier, during its travel with said carrier, into a position relative to the face area of said plate responsive and corresponding to the value of one selected variable, means responsive to and controlled by another variable for momentarily activating each unit to print an individual distinctive symbol against said plate as a platen when that unit in its movement with its said carrier reaches a position along the face area of said plate corresponding to the value at that time of said another variable, whereby individual distinctive symbols may be successively printed at one face of said plate to be visible through that plate representing successive changes in said variables.

2. The plotter as set forth in claim 1, having a paper sheet between the plate and printing units and abutting a face of the plate on which the symbols are printed in succession.

3. The plotter as set forth in claim 1, wherein the variables for each unit represent successive positions of a particular moving object in different directions, whereby the paths of a plurality of different moving objects may be plotted by marking their successive positions so as to be visible through said plate.

4. The plotter as set forth in claim 3, having a paper sheet on which the printing is done disposed between said plate and the passing printing units and abutting a face of said plate with the printed symbols on the paper visible through said plate.

5. The plotter as set forth in claim 3, and a light projection device disposed to project a light symbol against a face of said plate, in a direction approximately normal to said face, when activated, means mounting said projection device for movement on said support selectively in directions crosswise of each other in a plane parallel to a face of said plate, means responsive to the movements of a moving reference object for automatically moving said projection device in its said directions corresponding to the successive positions in the same directions of said reference object, and means for activating said projection device to project a light symbol upon said plate whenever one desires to visually compare positions of said moving reference object relatively to the positions of the other moving objects.

6. The plotter as set forth in claim 5, and means for determining the changing positions of each of said moving objects as shown on said plates by individual tracking electronic units located following said moving objects.

7. A plotter providing for high speed plotting at one face of a transparent plate of the successive positions of a plurality of objects while enabling concurrent plotting on the other face of said plate and evaluative study of the plots, which comprises said transparent plate, a support for said plate, a carrier, means mounting said carrier on said support for bodily translation of the carrier in successive passes of the same in the same direction parallel to and adjacent said plate, a plurality of recording devices mounted on said carrier for movement therewith and also upon the carrier in directions crosswise of the direction of carrier travel, one device representing each movable object, each such device having a part operable, when activated, during its said travel parallel to said plate to make a record of a symbol identifying its related object and visible through said plate, means including an individual servo motor and controlling circuit for each of said devices for moving each said device in opposite directions crosswise of its direction of travel in said passes in accordance with current conditions in its said controlling circuit, means including a controlling circuit for causing activation of said part of each recording device during one of its said passes to make its record when it reaches a selected position in each of said passes determined by selected circuit conditions in its controlling circuit, means for varying the circuit conditions in said controlling circuits for each recording device in accordance with changing positions of the moving object which that recording device represents, so as to activate that recording device and make successive records visible through said plate of successive positions of said objects.

8. The plotter as set forth in claim 7 wherein said means for varying circuit conditions includes a separate tracking device for each said moving object, operable to vary said circuit conditions in the controlling circuits of the related recording device for that object, automatically in accordance with changing conditions in the positions of the related moving object and cause the recorded positions to represent correctly and graphically the successive positions of each of said moving objects.

9. The plotter as set forth in claim 7, wherein said recording device has type which impinge on wax paper abutting face to face with the back face of said plate and cause the paper to adhere to said plate at the areas of contact and be visible from the front of said plate.

10. The plotter as set forth in claim 9 and means for edge lighting said plate to increase the visibility at the front of the plate of the areas of contact of the paper with the plate.

11. The plotter as set forth in claim 7, and means for also indicating on said plate any changing positions of a reference object where the plotting is taking place.

12. The plotter as set forth in claim 7, wherein the means including a controlling circuit that activates each recording device includes a trip circuit set off when circuit conditions in that controlling circuit reach selected conditions representing the position of the related moving object.

13. The plotter as set forth in claim 7, wherein each controlling circuit that activates its recording device includes a balancing component potentiometer engaged by a slider carried by the recording device.

14. The plotter as set forth in claim 12 wherein the trip circuit includes a thyratron tube control circuit.

15. A point-by-point plotter of successive positions of a moving object, which comprises a transparent plotting element, an endless carrier having a stretch extending parallel to and across the rear face of said element, means for operating said carrier to carry said stretch in successive passes across said rear face of said element, a recording unit carried by said carrier stretch for travel therewith and operable, while moving across said element to make a visual record visible through said element of a position of a moving object, means responsive to observations of said object for moving said unit in directions crosswise of its direction of travel with said carrier in accordance with changing positions of said object in one pair of opposite directions of its movement, and means responsive to signals representing changing positions in the pair of opposite directions crosswise of said first mentioned pair of directions and operable, at each pass when said unit reaches a position along said element representing the then relative position, to cause said unit to record its position at the rear face of said element.

References Cited in the file of this patent

UNITED STATES PATENTS

| | | |
|---|---|---|
| 1,225,796 | Fricke | May 15, 1917 |
| 1,293,747 | Ford | Feb. 11, 1919 |
| 2,413,300 | Dunn et al. | Dec. 31, 1946 |
| 2,506,353 | Finneran et al. | May 2, 1950 |
| 2,525,094 | Caldwell | Oct. 10, 1950 |
| 2,617,094 | Tinus | Nov. 4, 1952 |
| 2,620,256 | Kerns | Dec. 2, 1952 |
| 2,655,426 | Barnes | Oct. 13, 1953 |
| 2,669,500 | Och et al. | Feb. 16, 1954 |
| 2,714,047 | Dehmel | July 26, 1955 |
| 2,715,055 | Fryklind | Aug. 9, 1955 |
| 2,749,205 | Schmitt | June 5, 1956 |
| 2,759,783 | Ross | Aug. 21, 1956 |
| 2,787,511 | Ehret | Apr. 2, 1957 |

FOREIGN PATENTS

| | | |
|---|---|---|
| 337,445 | Germany | May 31, 1921 |